Jan. 20, 1942.   W. R. FREEMAN   2,270,431
EMERGENCY BRAKE CONTROL MECHANISM
Filed June 19, 1941
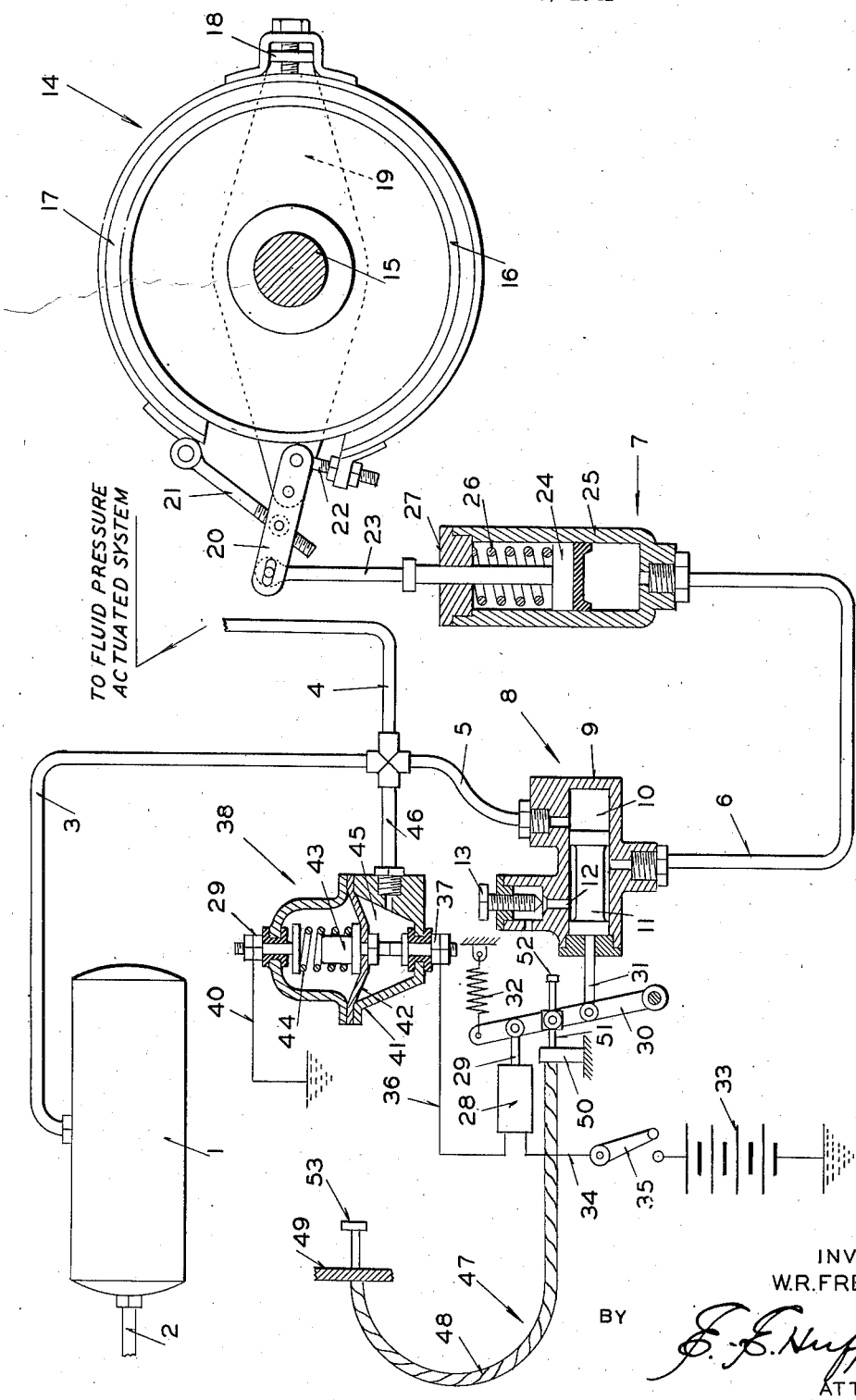
INVENTOR
W.R. FREEMAN
BY
*E. G. Huffman*
ATTORNEY Patented Jan. 20, 1942

2,270,431

UNITED STATES PATENT OFFICE 2,270,431

EMERGENCY BRAKE CONTROL MECHANISM

Walter R. Freeman, Clayton, Mo., assignor to Wagner Electric Corporation, St. Louis, Mo., a corporation of Delaware Application June 19, 1941, Serial No. 398,701

9 Claims. (Cl. 188—170)

My invention relates to brakes and more particularly to control means for an emergency brake.

One of the objects of my invention is to provide control means for a brake of a vehicle which will cause said brake to be automatically applied under certain conditions.

A more specific object of my invention is to provide control means for an emergency brake which is so associated with a fluid pressure actuating system that said emergency brake will be automatically applied and so maintained when the fluid pressure in the actuating system reaches a value below a predetermined pressure.

Another object is to provide means for association with a fluid pressure-actuated system on a vehicle which will automatically bring said vehicle to a stop whenever the source of fluid pressure drops below a value which is considered insufficient for efficient and proper operation of the fluid pressure actuated system.

Still another object is to associate with the automatically-operated emergency brake control means, manual control means for causing the brake to be held applied at will.

Other objects of my invention will become apparent from the following description taken in connection with the accompanying drawings in which the single figure is a schematic view of a brake control means embodying my invention.

Referring to the drawings in detail, the numeral 1 indicates an air pressure tank on a vehicle which receives compressed air through the conduit 2 from a suitable source, such as a compressor (not shown). Leading from this tank is a conduit 3 which is connected to conduit 4 for conveying air under pressure to any fluid pressure-actuated system such, for example, as an air pressure-actuated service braking system of a motor vehicle (not shown), said braking system comprising the usual control valve and conduits leading to brake actuating fluid motors.

A branch conduit 5 is also connected to conduit 3 for placing said conduit and the tank in communication with conduit 6 leading to a fluid motor 7. Interposed between conduits 5 and 6 for controlling admission of fluid under pressure from the tank to fluid motor 7 and exhausting it from said motor, is a valve 8. This valve comprises a casing 9 having a cylindrical chamber 10 in which is reciprocable a spool-type valve element 11. The port connections between chamber 10 and conduits 5 and 6 are so arranged that when the valve element is moved to the right hand end of the chamber, conduit 5 will be in direct communication with conduit 6, thus placing the fluid motor in communication with the air tank. When element 11 is moved to the left hand end of the chamber 10, conduit 5 will be disconnected from conduit 6 and the latter will be placed in communication with an atmospheric port 12, thereby permitting any fluid pressure in motor 7 to be exhausted to atmosphere. Associated with port 12 is a needle valve 13 for regulating the rate of flow of fluid under pressure through port 12.

The fluid motor 7 is employed to control the application and release of an emergency brake 14 on the motor vehicle, said brake being preferably associated with the usual propeller shaft 15. This brake comprises a drum 16 secured to the shaft, and a brake band 17 anchored at 18 to a support 19. The support has pivotally mounted thereon a lever 20 connected on opposite sides of its pivot to the ends of the band by adjustable rods 21 and 22. The outer end of the lever is connected by a piston rod 23 to piston 24 in cylinder 25 of the fluid motor 7. A strong spring 26 is interposed between the piston and the end 27 of the cylinder. The arrangement is such that spring 26 applies the brake band 17 to the drum when there is no fluid pressure acting on piston 24. When fluid pressure acts on said piston, spring 26 will be compressed and the brake band released from the drum.

The means for controlling valve element 11 of valve 8 is a solenoid 28, the plunger 29 of which is connected to actuate a pivoted lever 30, said lever being connected by a piston rod 31 to valve element 11. When the solenoid is energized, the lever will be moved to the position shown in the figure, thereby causing the valve element to be in a position where the fluid motor 7 will be connected to the atmosphere. This will permit spring 26 to apply the brakes. When the solenoid is deenergized, spring 32 associated with the lever moves element 11 to the position where conduit 5 will be in communication with conduit 6 to permit fluid under pressure from the tank to enter the fluid motor 7 and move piston 24 thereof to a position where brake band 17 will be disengaged.

The circuit for controlling solenoid 28 comprises a grounded battery 33 connected by a conductor 34 to one end of the winding of the solenoid. This conductor may have interposed therein a manual switch 35 which, if desired, can be the ignition switch for the engine of the motor vehicle. The other end of the winding of the solenoid is connected by a conductor 36 to one terminal 37 of a fluid pressure-controlled switch 38, the other terminal 39 of said switch being connected to ground by a conductor 40.

The fluid pressure-controlled switch comprises a two-part casing 41 having interposed between its parts a diaphragm 42. This diaphragm carries a plunger 43 of conducting material, and a spring 44 biases the plunger to a position where the plunger engages the terminal 37. Since spring 44 abuts the other terminal 39, the switch is closed when the plunger is engaged with terminal 37. The chamber 45 below the diaphragm is in communication with the pressure tank 1 by a conduit 46 connected to conduit 3. Thus when the pressure in the tank is of sufficient value to overcome the action of spring 44 and move the diaphragm upwardly, the switch will be opened. If the fluid pressure falls below a value sufficient to compress the spring, the switch will be held closed by the spring.

The spring 44 is so calibrated that the switch will be closed whenever the pressure in the tank falls below a value which is insufficient to result in proper and efficient operation of the fluid pressure-actuated system connected to the branch conduit 4 previously referred to. When such condition arises and provided the manual switch 35 is closed, solenoid 28 will be energized and as a result thereof valve element 11 of valve 8 will be so positioned that fluid motor 7 will be connected to the atmosphere. When this occurs, spring 26 is effective to apply band 17 of the emergency brake and thus bring the vehicle to a stop if not already in stopped condition. If the vehicle is stopped, the brake will be applied and the vehicle will be prevented from moving. By adjustment of needle valve 13, the rate of application of the brake can be made slow or fast as desired. Thus it is seen that the emergency brake will always be applied whenever the pressure in the tank becomes dangerously low, that is, so low that the fluid pressure-actuated system cannot be properly operated. If such system is the vehicle braking system, then the operator is warned that there is not enough air pressure in the tank to give efficient operation of the brakes and the cause should be found and corrected. By having the manual switch 35 in the circuit, the circuit can be broken whenever the vehicle is left standing for a long time without any possibility of a drop in pressure causing energization of the solenoid and unnecessary consumption of current. The opening of switch 35 also insures release of the brake, if applied, and there is sufficient fluid pressure to accomplish the release.

When the pressure in tank 1 is above the predetermined value necessary to cause the pressure-controlled switch to be opened, the solenoid will be deenergized and spring 32 will move valve element 11 of valve 8 to the right and cause the fluid motor 7 to be in direct communication with the pressure tank. Fluid under pressure can thus operate piston 24 of the fluid motor and release the brakes and maintain them in released condition as long as the fluid motor is in communication with the tank through valve 8.

Provision is also made to permit the emergency brake to be applied at will. The structure shown to accomplish this comprises a Bowden wire 47, the ends of the sheath 48 of which are secured to fixed supports 49 and 50, as is the usual practice.

The wire 51 within the sheath has one end provided with a collar 52 for engaging lever 30, and its other end is provided with a hand button 53 placed in a suitable position to be grasped by the vehicle operator. Thus by pulling on the button 53, lever 30 can be moved to a position where valve element 11 of the valve places the fluid motor in communication with the atmosphere thereby exhausting the cylinder of the fluid motor and permitting the spring to apply the emergency brake and hold it applied.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In combination with a fluid pressure-actuated system provided with a stored source of fluid pressure, a brake, spring means for applying said brake, means operable by fluid pressure from the source of pressure for maintaining said brake disengaged, and means controlled by fluid pressure from the source for preventing pressure from the source from maintaining the brake disengaged and permitting engagement of the brake by the spring means when the pressure of the source drops below a predetermined value.

2. In combination with the fluid pressure-actuated system provided with a stored source of fluid pressure, a brake, spring means for applying said brake, means operable by fluid pressure from the source of pressure for maintaining said brake disengaged, means controlled by fluid pressure from the source for preventing pressure from the source from maintaining the brake disengaged and permitting engagement of the brake by the spring means when the pressure drops below a predetermined value, and manually-controlled means for permitting said brake to be engaged by the spring means notwithstanding the pressure source does not drop below said predetermined value.

3. In combination with a fluid pressure-actuated system provided with a stored source of pressure, a brake, spring means for applying said brake, means operable by fluid pressure from the source of pressure for maintaining said brake disengaged, means controlled by fluid pressure from the source for preventing pressure from the source from maintaining the brake disengaged and permitting engagement of the brake by the spring means when the pressure drops below said predetermined value, said last named means comprising a control valve, and means controlled by fluid pressure from the source for causing said control valve to place the fluid motor in communication with the source or disconnect it therefrom.

4. In combination with a fluid pressure-actuated system provided with a stored source of pressure, a brake, spring means for applying said brake, means operable by fluid pressure from the source of pressure for maintaining said brake disengaged, means controlled by fluid pressure from the source for preventing fluid pressure from the source from maintaining the brake disengaged and permitting engagement of the brake by the spring means when the pressure drops below said predetermined value, said last named means comprising a control valve and means controlled by the fluid pressure from the source for causing said control valve to place the fluid motor in communication with the source or disconnect it therefrom, and manual means controllable from a remote point for placing said valve in a position where the brake will be caused to be engaged notwithstanding the pressure of the source is above the predetermined value.

5. In combination with a fluid pressure-actuated system provided with a stored source of fluid pressure, a brake, spring means for applying the brake, a fluid motor for disengaging the brake, means comprising a valve and conduit means for selectively placing the fluid motor in communication with the source of fluid pressure or with the atmosphere, and means for so controlling said valve by the fluid pressure of the source that said brake will be disengaged when the fluid pressure of the source is above a predetermined value and engaged when the fluid pressure of said source drops below said predetermined value.

6. In combination with a fluid pressure-actuated system provided with a stored source of fluid pressure, a brake, spring means for applying the brake, a fluid motor for disengaging the brake, means comprising a valve and conduit means for selectively placing the fluid motor in communication with the source of fluid pressure or with the atmosphere, means for so controlling said valve by the fluid pressure of the source that said brake will be disengaged when the fluid pressure of the source is above a predetermined value and engaged when the fluid pressure of said source drops below said predetermined value, said last named means comprising a fluid motor connected to the source of fluid pressure, and spring means for biasing the movable element of the fluid motor to one position whenever the fluid pressure in the motor is insufficient to compress the spring by moving the movable element to another position.

7. In combination with a fluid pressure-actuated system provided with a stored source of fluid pressure, a brake, spring means for applying the brake, a fluid motor for disengaging the brake, means comprising a valve and conduit means for selectively placing the fluid motor in communication with the source of fluid pressure or with atmosphere, a solenoid for controlling said valve, an electrical circuit for the solenoid including a switch in said circuit, and means controlled by fluid pressure from the source for maintaining said switch open when the pressure is above a predetermined value.

8. In combination with a fluid pressure-actuated system provided with a stored source of fluid under pressure, a brake, spring means for applying the brake, a fluid motor for disengaging the brake, means comprising valve means and conduit means for selectively placing the fluid motor in communication with the source of pressure and with the atmosphere, spring means for normally biasing the valve means to a position where the motor is connected to the source, a solenoid connected to the valve means for causing it to assume a position placing the motor in communication with the atmosphere when said solenoid is energized, an electrical circuit for the solenoid comprising a switch, means for biasing the switch to closed position, and a fluid motor connected to the source for maintaining the switch open when the pressure of the source is above a predetermined value.

9. In combination with a fluid pressure-actuated system provided with a stored source of fluid under pressure, a brake, spring means for applying the brake, a fluid motor for disengaging the brake, means comprising valve means and conduit means for selectively placing the fluid motor in communication with the source of pressure and with the atmosphere, spring means for normally biasing the valve means to a position where the motor is connected to the source, a solenoid connected to the valve means for causing it to assume a position placing the motor in communication with the atmosphere when said solenoid is energized, an electrical circuit for the solenoid comprising a switch, means for biasing the switch to closed position, a fluid motor connected to the source for maintaining the switch open when the pressure of the source is above a predetermined value, and manual means operable from a remote point for placing said valve means in a position where the motor is connected to the atmosphere.

WALTER R. FREEMAN.